United States Patent
Shekhter et al.

(10) Patent No.: US 11,965,652 B2
(45) Date of Patent: Apr. 23, 2024

(54) MOUNTING SYSTEM FOR A SENSOR IN A DUCTWORK

(71) Applicant: Valmet AB, Sundvall (SE)

(72) Inventors: Mikhail Y. Shekhter, South Portland, ME (US); Kristen K. Bandle, Limerick, ME (US); Robert H. Miller, III, Gray, ME (US)

(73) Assignee: Valmet AB, Sundvall (SE)

( * ) Notice: Subject to any disclaimer, the term of this patent is extended or adjusted under 35 U.S.C. 154(b) by 136 days.

(21) Appl. No.: 17/695,908

(22) Filed: Mar. 16, 2022

(65) Prior Publication Data

US 2023/0296248 A1    Sep. 21, 2023

(51) Int. Cl.
| | |
|---|---|
| *F23N 5/00* | (2006.01) |
| *D06F 58/26* | (2006.01) |
| *D06F 58/50* | (2020.01) |
| *G01N 21/39* | (2006.01) |

(52) U.S. Cl.
CPC ........... *F23N 5/003* (2013.01); *D06F 58/263* (2013.01); *D06F 58/50* (2020.02); *G01N 21/39* (2013.01); *F23N 2241/08* (2020.01); *F23N 2900/05005* (2013.01); *G01N 2201/06113* (2013.01)

(58) Field of Classification Search
CPC .................. F23N 5/003; F23N 2241/08; F23N 2900/05005; D06F 58/263; D06F 58/50; G01N 21/39; G01N 2201/06113
USPC .......................................................... 356/437
See application file for complete search history.

(56) References Cited

U.S. PATENT DOCUMENTS

| | | | |
|---|---|---|---|
| 2009/0288399 A1* | 11/2009 | Fayard ................. | F01N 3/0256 60/303 |
| 2015/0275702 A1* | 10/2015 | Urbanski ............... | F02C 7/141 60/39.5 |
| 2016/0216712 A1* | 7/2016 | Baumgartner ........... | A61L 2/24 |
| 2018/0149063 A1* | 5/2018 | Oshiumi ............... | F02D 41/025 |
| 2018/0180280 A1* | 6/2018 | Neuschaefer .......... | F23N 5/242 |
| 2018/0231260 A1* | 8/2018 | Wilson ................ | F24D 19/1096 |
| 2020/0375396 A1* | 12/2020 | Rahmani ............. | A47J 37/0786 |
| 2021/0148607 A1* | 5/2021 | Wabel .................. | F24D 19/109 |
| 2021/0376613 A1* | 12/2021 | Cummings ............ | H02J 3/381 |
| 2022/0136698 A1* | 5/2022 | Jayarathne ............. | F23N 5/022 431/13 |
| 2022/0266185 A1* | 8/2022 | Bailey ................ | B01D 46/0041 |
| 2022/0299395 A1* | 9/2022 | Ponyavin ............... | F02D 41/22 |

OTHER PUBLICATIONS

Yokogawa "Probe Type Tunable Diode Laser Spectrometer TDLS8100" May 2020; OpreX Analyzers: TDLS8100; 4 pages.

\* cited by examiner

*Primary Examiner* — Md M Rahman
(74) *Attorney, Agent, or Firm* — Pierce Atwood LLP (57) ABSTRACT

A mounting system for a laser detection sensor in a ductwork for the detection of unburnt fuel is provided. The mounting system includes a laser transmitter mount configured to provide adjustment of a laser transmitter and a laser receiver mount configured to provide adjustment of a laser receiver. The mounting system also includes a laser path extending between the laser transmitter and the laser receiver that includes an entrance port in the ductwork and an exit port in the ductwork. The mounting system also includes a flexible joint in the mounting system, where the flexible joint is configured to isolate at least one of the laser transmitter and the laser receiver from movement of the ductwork.

25 Claims, 8 Drawing Sheets

MOUNTING SYSTEM FOR A SENSOR IN A DUCTWORK

FIELD OF THE INVENTION

The invention relates, in part, to a system for mounting a sensor in a ductwork, such as the ductwork in a hot air dryer.

BACKGROUND

In a hot air dryer, such as a through-air apparatus, process air flows through the ductwork. The apparatus typically includes a direct-fired burner to heat the process air. Safety features may be employed to ensure the safe startup and operation of both the direct-fired burner and the air system in which the burner operates. For example, a sensor may be placed within the ductwork to detect the presence of unburnt fuel within the ductwork.

SUMMARY OF THE INVENTION

According to one embodiment, a mounting system for a laser detection sensor in a ductwork for the detection of unburnt fuel is provided. The mounting system includes a laser transmitter mount configured to provide adjustment of a laser transmitter and a laser receiver mount configured to provide adjustment of a laser receiver. The mounting system also includes a laser path extending between the laser transmitter and the laser receiver that includes an entrance port in the ductwork and an exit port in the ductwork. The mounting system also includes a flexible joint in the mounting system, where the flexible joint is configured to isolate at least one of the laser transmitter and the laser receiver from movement of the ductwork.

According to another embodiment, a system for detecting unburnt fuel in an apparatus for drying, bonding and/or curing a web is provided. The system includes a ductwork, and a laser detection sensor including a laser transmitter and a laser receiver, the laser detection sensor configured to detect unburnt fuel inside of the ductwork. It also includes a system for mounting the laser detection sensor in the ductwork, the mounting system including a laser transmitter mount configured to support the laser transmitter on a first side of the ductwork, a laser receiver mount configured to support the laser receiver on a second side of the ductwork, and a laser path extending between the laser transmitter and the laser receiver. The laser path includes an entrance port in the ductwork and an exit port in the ductwork. The mounting system also includes a flexible joint in the mounting system, where the flexible joint is configured to isolate at least one of the laser transmitter and the laser receiver from movement of the ductwork.

DETAILED DESCRIPTION

The present disclosure is directed to a mounting system for a laser detection sensor in a ductwork for the detection of unburnt fuel. As mentioned above, a hot air dryer typically includes a direct-fired burner to heat the process air that flows through the ductwork of the apparatus. Conventional safety devices, such as pressure switches, flow switches, and temperature switches may be provided in the through-air apparatus to ensure that the components are operating properly. It is also known to place a sensor within the ductwork to detect the presence of unburnt fuel within the ductwork.

Figure 1:
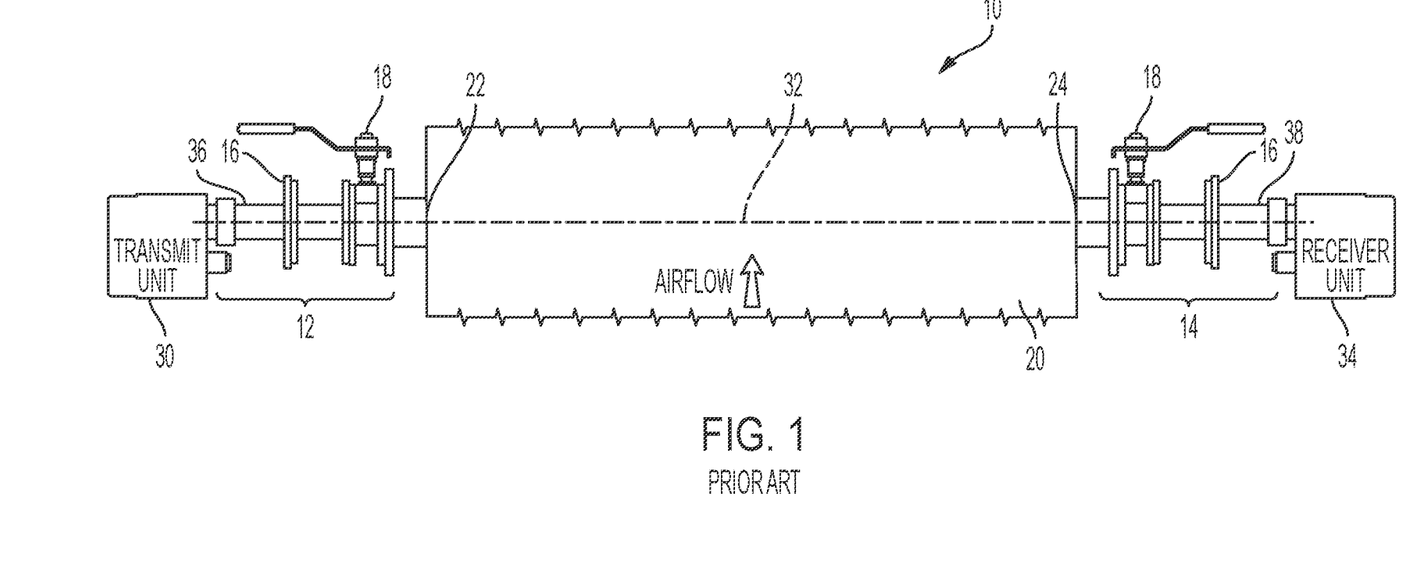
FIG. 1 is a schematic illustration of a prior art mounting system for a laser detection sensor in a ductwork.

FIG. 1 is a schematic illustration of a prior art mounting system 10 for a laser detection sensor 30, 34 in a ductwork 20. As shown, the laser detection sensor includes a laser transmitter 30 which is configured to transmit a laser path 32 through a cross-sectional path of the ductwork 20. The laser detection sensor also includes a laser receiver 34 which is configured to receive the laser on the other side of the ductwork 20. As shown, the laser path 32 travels from the laser transmitter 30, through an entrance port 22 in the ductwork 20, across the ductwork 20, and through an exit port 24 in the ductwork 20, and to the laser receiver 34.

The laser detection sensor 30, 34 is calibrated to measure the unburnt fuel concentration in the ductwork 20. As shown, the laser path 32 extends across the ductwork 20. If unburnt fuel is present within the ductwork, the laser beam is attenuated, which is measured by the laser detection sensor 30, 34. This can then be correlated to the concentration of unburnt fuel and compared to the Lower Explosive Limit (LEL, and also known as LFL, Lower Flammability Limit) to ensure safe operating conditions. Further details regarding the laser detection sensor 30, 34 are discussed below.

As shown in FIG. 1, the prior art mounting system 10 for the laser detection sensor 30, 34 includes a first rigid mount 12 configured to hold the laser transmitter 30 and a second rigid mount 14 configured to hold the laser receiver 34. The first rigid mount 12 is defined as the one or more components that extend between the laser transmitter 30 and the entrance port 22 of the ductwork 20, and the second rigid mount 14 is defined as the one or more components that extend between the exit port 24 of the ductwork 20 and the laser receiver 34. As shown, the first mount 12 includes a mounting flange 16 and a valve 18 fixed to a conduit 36 that extends between the laser transmitter 30 and the entrance port 22 in the ductwork 20. Similarly, the second mount 14 also includes a mounting flange 16 and a valve 18 fixed to a conduit 38 that extends between the exit port 24 in the ductwork 20 and the laser receiver 34.

Applicant recognized that it would be desirable to incorporate the laser detection sensor 30, 34 shown in FIG. 1 into the ductwork of a hot air dryer. However, Applicant also recognized problems associated with the prior art mounting system 10 shown in FIG. 1 if implemented into the ductwork of a hot air dryer. In particular, in a hot air dryer, the temperature of the process air flowing through the ductwork 20 can range from ambient temperatures (i.e. 60-75° F.) up to about 900° F. In one embodiment, the temperature of the process air may range from 500° F. to 900° F. This high temperature process air may cause thermal growth of the ductwork 20 which may then cause misalignment between the transmitter 30 and the receiver 34. Applicant recognized that misalignment between the transmitter 30 and the receiver 34 may cause the laser detection sensor to produce inaccurate results or a complete loss of signal. Applicant also recognized that other factors, other than thermal growth, including but not limited to movement, also including deflection, or distortion of the ductwork, caused by vibration, fluid pressure, applied forces, or flow variations within the ductwork 20 may also cause misalignment between the transmitter 30 and the receiver 34. Furthermore, Applicant recognized that the large size of a typical hot air dryer and its associated ductwork 20 may also exacerbate the problem of undesirable movement of the ductwork 20.

Thus, aspects of the present disclosure are directed to a mounting system for a laser detection sensor in a ductwork that overcomes the problems associated with movement of the ductwork 20 which may, for example, be caused by thermal growth and/or vibrations.

As set forth in more detail below, in one embodiment, the mounting system includes a flexible joint which is configured to isolate at least one of the laser transmitter and the laser receiver from movement of the ductwork. By isolating the laser transmitter and/or the laser receiver, it is shielded from undesirable movement of the ductwork which may maintain proper alignment between the laser transmitter and the laser receiver. The below described mounting systems may help to mitigate laser signal disturbances during operation so that the laser detection sensor 30, 34 can be used to accurately detect the presence of unburnt fuel in the ductwork, despite movement of the ductwork.

Figure 2:
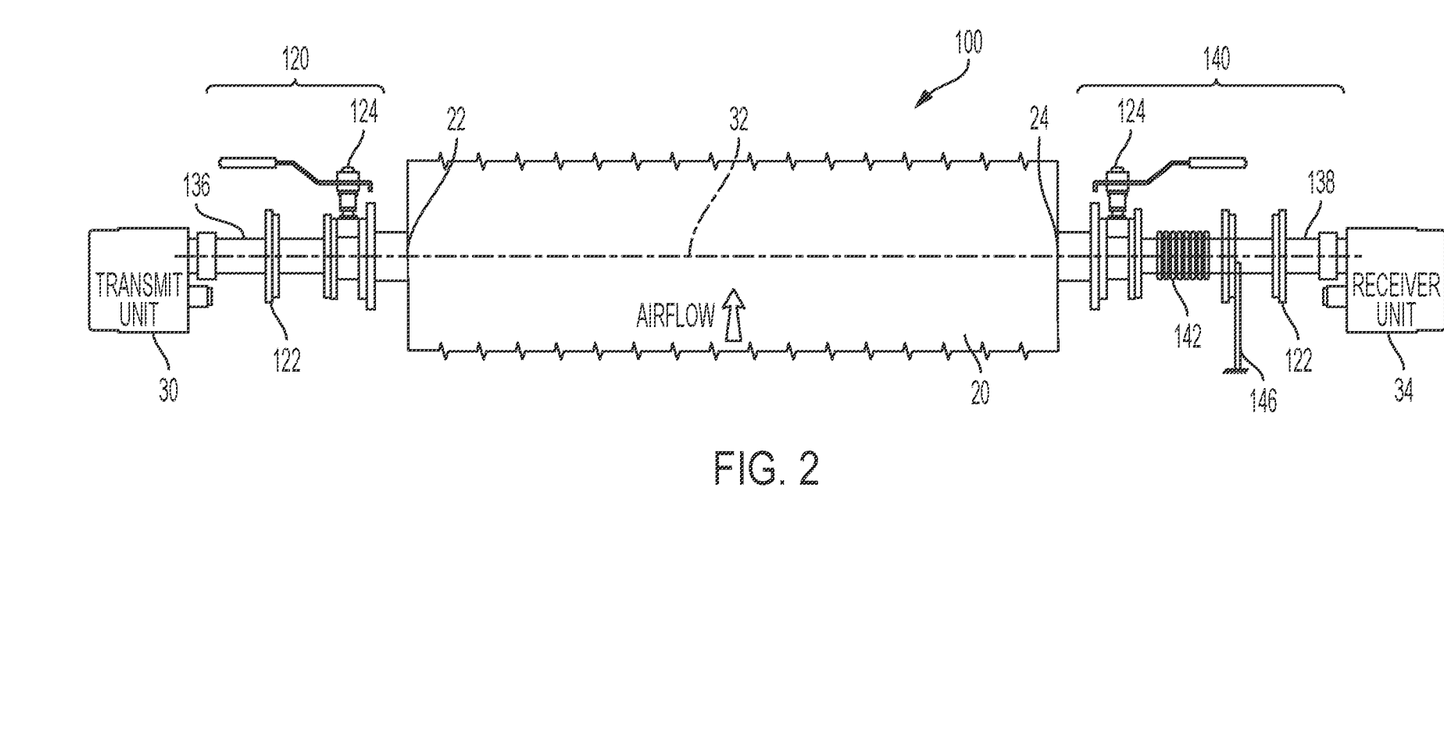
FIG. 2 is a schematic illustration of one embodiment of a mounting system for a laser detection sensor in a ductwork which includes one flexible joint.

Turning now to FIG. 2, one embodiment of a mounting system 100 for a laser detection sensor 30, 34 in a ductwork 20 which includes one flexible joint 142 is illustrated. Similar to the laser detection sensor 30, 34 shown in FIG. 1, the laser detection sensor 30, 34 includes a laser transmitter 30 which is configured to transmit a laser path 32 through a cross-sectional path of the ductwork 20. The laser detection sensor also includes a laser receiver 34 which is configured to receive the laser. As shown, the laser path 32 travels through an entrance port 22 in the ductwork 20, through the ductwork 20, and then through an exit port 24 in the ductwork 20.

As shown in FIG. 2, the illustrative mounting system 100 includes a first mount 120 configured to hold the laser transmitter 30 and a second mount 140 configured to hold the laser receiver 34. The first mount 120 may be defined as the one or more components that extend between the laser transmitter 30 and the entrance port 22 of the ductwork 20, and the second mount 140 may be defined as the one or more components that extend between the exit port 24 of the ductwork 20 and the laser receiver 34. As shown, the first mount 120 includes a mounting flange 122 and a valve 124 fixed to a conduit 136 that extends between the laser transmitter 30 and the entrance port 22 in the ductwork 20. Similarly, the second mount 140 also includes a mounting flange 122 and a valve 124 fixed to a conduit 138 that extends between the exit port 24 in the ductwork 20 and the laser receiver 34.

Figure 6:
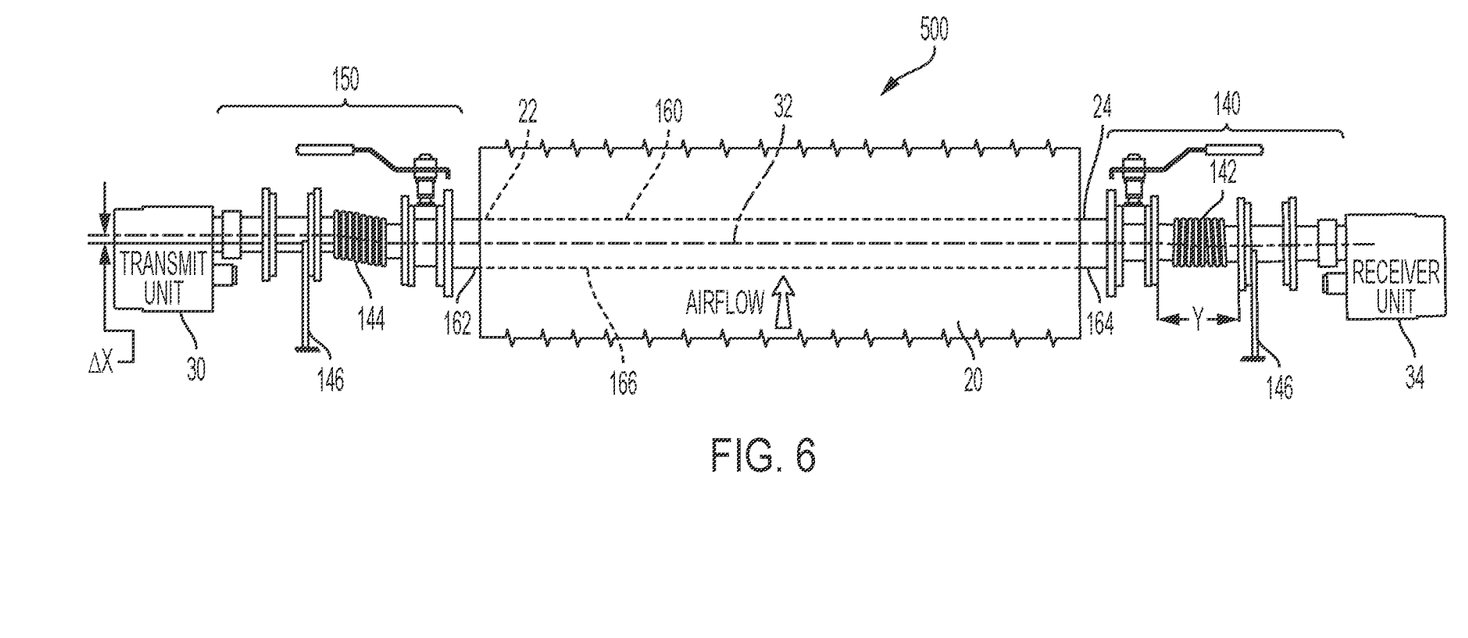
FIG. 6 is a schematic illustration of another embodiment of a mounting system for a laser detection sensor in a ductwork which is configured to provide planar and/or angular adjustment to compensate for misalignment or movement.

As set forth in more detail below, the first mount 120 (i.e. laser transmitter mount) is configured to provide adjustment of a laser transmitter 30, and the second mount 140 (i.e. laser receiver mount) is configured to provide adjustment of a laser receiver 34. As discussed below, the laser transmitter mount 120 and the laser receiver mount 140 may be configured to provide angular adjustment and/or linear adjustment of the laser transmitter 30 and/or the laser receiver 34. This angular and/or linear adjustment is shown in FIG. 6 which is discussed in more detail below.

As shown in FIG. 2, the mounting system 100 also includes a flexible joint 142 which is configured to isolate the laser receiver 34 from movement of the ductwork 20. In one embodiment, the flexible joint is an expansion joint (i.e. bellows) such as a stainless steel convoluted expansion joint obtained from Grainger or McMaster-Carr. The Applicant recognized that the flexible joint 142 may absorb thermal expansion and/or other type of undesired movement of the ductwork 20 to maintain alignment between the laser detection 30 and the laser receiver 34.

Applicant recognized that as process air passes through the ductwork 20 (as indicated by the up arrow shown in FIG. 2), the walls of the ductwork may move, for example, due to thermal growth and/or vibrations. Without the flexible joint 142, this may cause misalignment between the entrance port 22 and the exit port 24. However, the flexible joint 142 is configured to isolate the laser receiver 34 from such undesirable movement. As shown, in the embodiment illustrated in FIG. 2, the flexible joint 142 is positioned adjacent the exit port 24 in the ductwork 20.

As shown in FIG. 2, adjacent the flexible joint 142 is a fixed support 146 which is configured to couple the laser receiver 34 to the surrounding environment, such as the building steel or foundation. It should be recognized that the flexible joint 142 is configured to absorb any movement of the ductwork 20 while the fixed support 146 helps to stabilize the position of the laser receiver 34.

Figure 3:
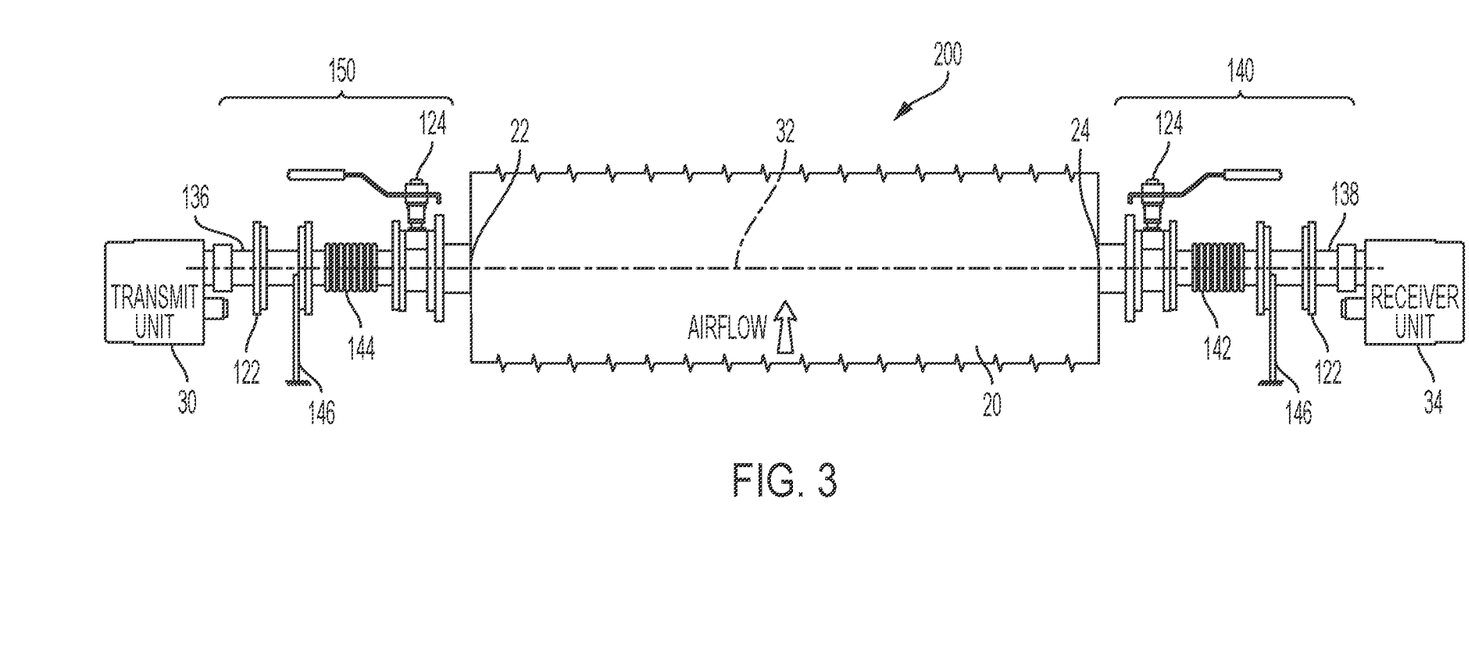
FIG. 3 is a schematic illustration of another embodiment of a mounting system for a laser detection sensor in a ductwork which includes a first flexible joint and a second flexible joint.

FIG. 3 illustrates another embodiment of a mounting system 200 for a laser detection sensor in a ductwork which includes a first flexible joint 142 and a second flexible joint 144. As shown in FIG. 3, the illustrative mounting system 200 includes a first mount 150 configured to hold the laser transmitter 30 and a second mount 140 configured to hold the laser receiver 34. As shown, the first mount 150 includes a mounting flange 122 and a valve 124 fixed to a conduit 136 that extends between the laser transmitter 30 and the entrance port 22 in the ductwork 20. Similarly, the second mount 140 also includes a mounting flange 122 and a valve 124 fixed to a conduit 138 that extends between the exit port 24 in the ductwork 20 and the laser receiver 34. As mentioned above, in this embodiment, the laser transmitter mount 150 is configured to provide adjustment of a laser transmitter 30, and the laser receiver mount 140 is configured to provide adjustment of a laser receiver 34.

In this particular embodiment shown in FIG. 3, the mounting system 200 further includes a flexible joint 144 which is configured to isolate the laser transmitter 30 from movement of the ductwork 20, and another flexible joint 142 which is configured to isolate the laser receiver 34 from movement of the ductwork 20. In this illustrative embodiment, one flexible joint 144 is positioned adjacent the entrance port 22 in the ductwork 20, and the flexible joint 142 is positioned adjacent the exit port 24 in the ductwork 20.

As shown in FIG. 3, adjacent the flexible joint 142 is a fixed support 146 which is configured to couple the laser receiver 34 to the surrounding environment, such as the building steel or foundation. It should be recognized that the flexible joint 142 is configured to absorb any movement of the ductwork 20 while the fixed support 146 helps to stabilize the position of the laser receiver 34. As also shown in FIG. 3, adjacent the flexible joint 144 is another fixed support 146 which is configured to couple the laser transmitter 30 to the surrounding environment, and this fixed support 146 is configured to stabilize the position of the laser transmitter 30.

It should be appreciated that in all of the embodiments described in this disclosure, the specific type of the laser detection sensor 30, 34 may vary as the disclosure is not limited in this respect. One of ordinary skill in the art will appreciate that different types of laser detection sensors are known. In one embodiment, the laser detection sensor is obtained from Teledyne or Yokogawa.

Figure 4:
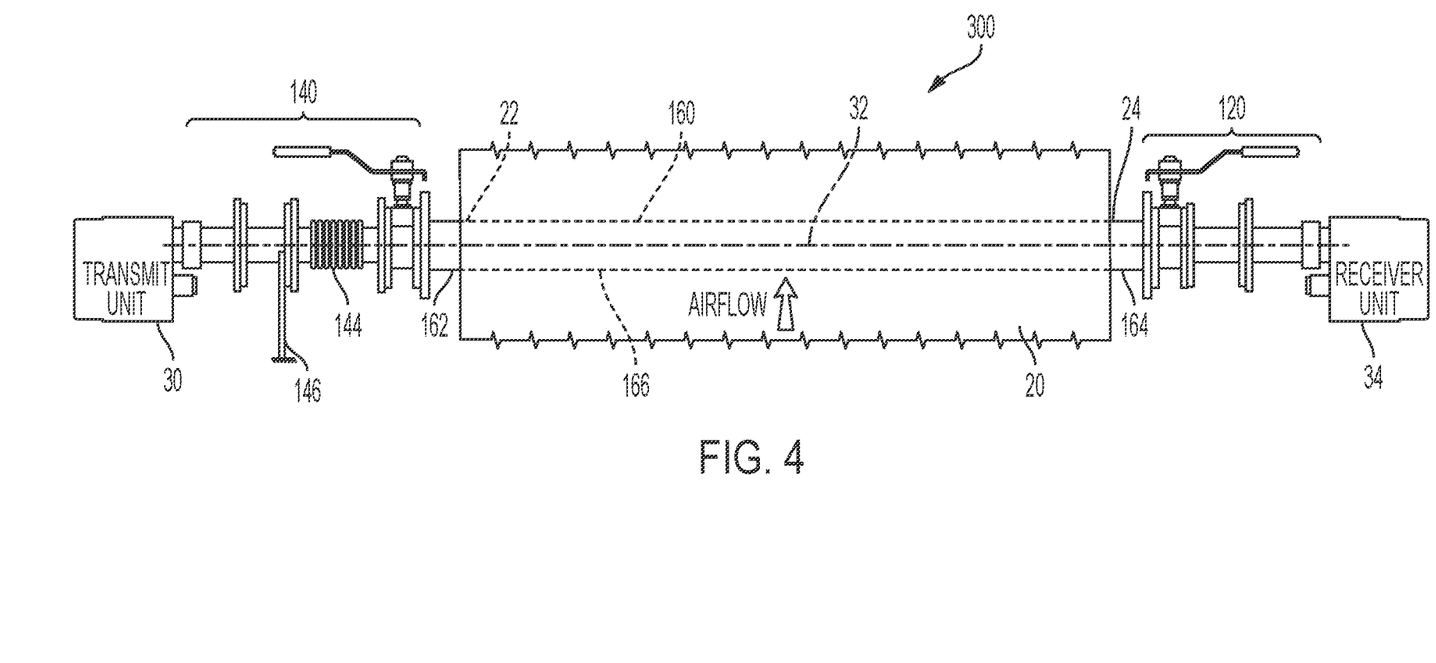
FIG. 4 is a schematic illustration of another embodiment of a mounting system for a laser detection sensor in a ductwork which includes a flexible joint and a pipe.

Turning now to FIG. 4, which illustrates another embodiment of a mounting system 300 for a laser detection sensor 30, 34 in a ductwork 20. Similar to the above-described embodiment shown in FIGS. 3, the mounting system 300 also includes a flexible joint 144 which is configured to isolate the laser transmitter 30 from movement of the ductwork 20. In the embodiment illustrated in FIG. 4, the flexible joint 144 is positioned adjacent the entrance port 22 in the ductwork 20. As shown in FIG. 4, adjacent the flexible joint 144 is a fixed support 146 which is configured to couple the laser transmitter 30 to the surrounding environment, and the fixed support 146 is configured to stabilize the position of the laser transmitter 30.

As shown in FIG. 4, the mounting system 300 also includes a pipe 160 extending through the ductwork 20 from a first end 162 extending outwardly from the entrance port 22 in the ductwork 20 to a second end 164 extending outwardly from the exit port 24 in the ductwork 20. In one embodiment, the pipe 160 is configured to ensure proper alignment between the laser transmitter 30 and the laser receiver 34. In one embodiment, the pipe 160 is also configured to isolate at least one of the laser transmitter 30 and the laser receiver 34 from movement of the ductwork 20. As shown, the pipe 160 is positioned such that the laser path 32 passes from the laser transmitter 30, through the pipe 160, and to the laser receiver 34.

As shown, the pipe 160 may include one or more openings 166 within the walls of the pipe 160. These openings 166 allow for the process air flowing through the ductwork 20 to also flow through the pipe 160, so that the laser detection sensor 30, 34 is able to measure the unburnt fuel concentration in the ductwork 20. In one embodiment, these openings 166 may make the pipe 160 less rigid (i.e. flexible) such that the pipe 160 can maintain alignment between the laser detection 30 and the laser receiver 34.

It is contemplated that the one or more openings 166 in the pipe 160 may include holes, perforations, slots, etc. Furthermore, it is also contemplated that the pipe 160 may be cylindrical shaped having a circular cross-sectional shape, however other shapes are also contemplated. It is also contemplated that the pipe 160 may include a gasket at one or both of the first end 162 and the second end 164 of the pipe 160. In one illustrative embodiment, the flexible joint 144 is positioned at the first end 162 of the pipe 160.

Figure 5:
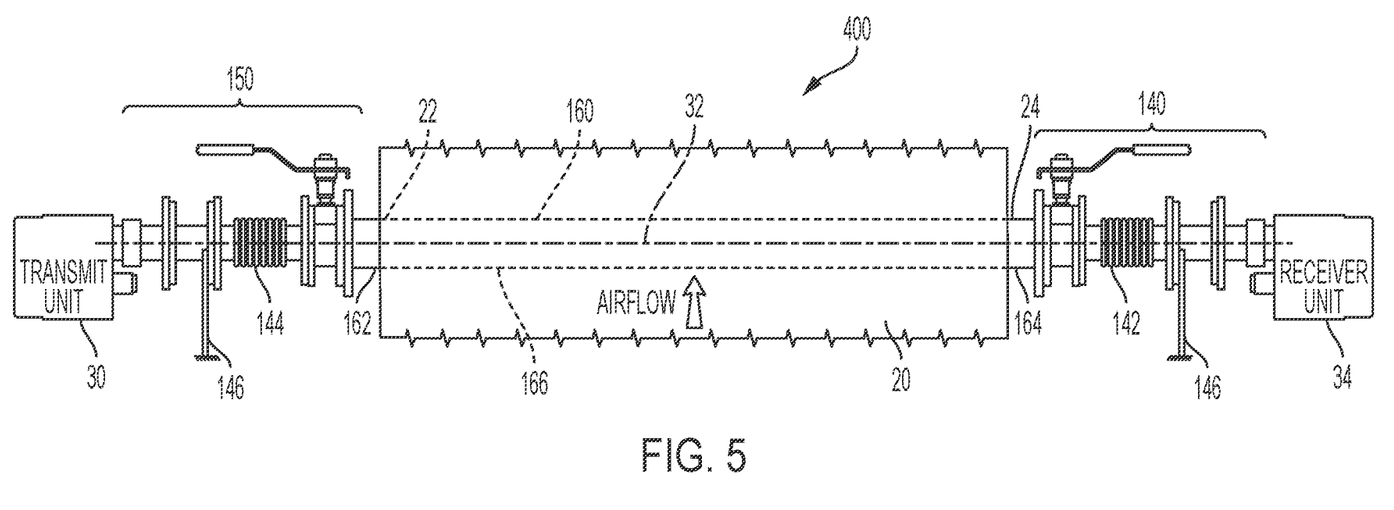
FIG. 5 is a schematic illustration of yet another embodiment of a mounting system for a laser detection sensor in a ductwork which includes a first flexible joint, a second flexible joint and a pipe.

FIG. 5 illustrates yet another embodiment of a mounting system 400 for a laser detection sensor 30, 34 in a ductwork 20. Similar to the above-described embodiment shown in FIG. 4, the mounting system 400 also includes a pipe 160 extending through the ductwork 20 from a first end 162 extending outwardly from the entrance port 22 in the ductwork 20 to a second end 164 extending outwardly from the exit port 24 in the ductwork 20. In one embodiment, the pipe 160 is configured to ensure proper alignment between the laser transmitter 30 and the laser receiver 34. In one embodiment, the pipe 160 is also configured to isolate at least one of the laser transmitter 30 and laser receiver 34 from movement of the ductwork 20.

In this particular embodiment shown in FIG. 5, the mounting system 400 further includes a flexible joint 144 which is configured to isolate the laser transmitter 30 from movement of the ductwork 20, and another flexible joint 142 which is configured to isolate the laser receiver 34 from movement of the ductwork 20. In one illustrative embodiment, the flexible joint 144 is positioned at the first end 162 of the pipe 160 and the other flexible joint 142 is positioned adjacent the second end 164 of the pipe 160. As shown, a fixed support 146 may be positioned adjacent the flexible joint 144 to stabilize the position of the laser transmitter 30, and another fixed support 146 may be positioned adjacent the other flexible joint 142 to stabilize the position of the laser receiver 34.

FIG. 6 is another embodiment of a mounting system 500 for a laser detection sensor in a ductwork 20 which illustrates how the mounting system 500 is configured to provide planar and/or angular adjustment. It should be understood that this adjustment may be beneficial to properly install and calibrate the laser detection sensor to ensure proper alignment between the laser transmitter 30 and the laser receiver 34. Many of the components of the mounting system 500 are similar to the above-described components illustrated in FIG. 5, and thus are given identical reference numbers. In one illustrative embodiment, at least one of the laser transmitter mount 150 and the laser receiver mount 140 may be adjustable. For example, in one embodiment, at least one of the laser transmitter mount 150 and the laser receiver mount 140 is able to move an angular dimension Y. This adjustability enables the angular movement of the transmitter/receiver to that of the entrance/exit port flange. Also, in one embodiment, at least one of the laser transmitter mount 150 and the laser receiver mount 140 is able to move a vertical or horizontal distance X. As shown, the distance X is in the direction substantially perpendicular to that of the laser path 32. It should be appreciated that this distance X and angle Y enables the two mounts 150, 140 to move linearly and angularly to adjust the laser transmitter 30 and the laser receiver 34, such that the optical path between the two units are aligned.

Figure 7:
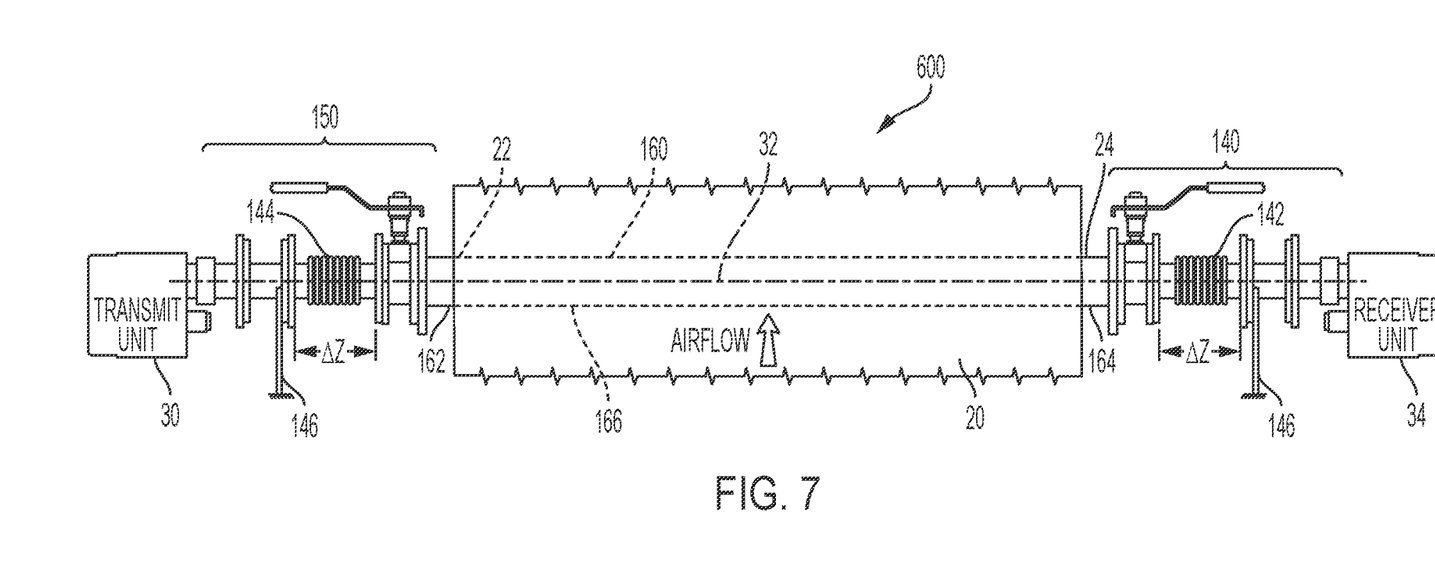
FIG. 7 is a schematic illustration of another embodiment of a mounting system for a laser detection sensor in a ductwork which is configured to provide axial adjustment to compensate for misalignment or movement.

FIG. 7 is a schematic illustration of yet another embodiment of a mounting system 600 for a laser detection sensor in a ductwork 20. Many of the components of the mounting system 600 are similar to the above-described components illustrated in the above-described figures, and thus are given identical reference numbers. FIG. 7 illustrates the axial adjustment of the first and second flexible joints 142, 144 to accommodate for movement of the ductwork 20. As shown, in this embodiment, both the first and second flexible joints 142, 144 are capable of moving a horizontal distance Z relative to the adjacent fixed support 146. As shown, the distance Z is in the direction of the laser path 32 (i.e. and also the centerline of the pipe 160). As mentioned above, the first flexible joint 142 and/or the second flexible joint 144 are configured to isolate at least one of the laser transmitter 30 and the laser receiver 34 from movement of the ductwork 20 that may be caused by thermal growth/expansion, including but not limited to movement, also including deflection, or distortion of the ductwork, caused by vibration, fluid pressure, applied forces, or flow variations within the ductwork 20. It should be appreciated that the flexible joint 142, 144 then maintains proper alignment between the transmitter 30 and the receiver 34 to ensure the accuracy of the laser detection sensor 30, 34.

Figure 8:
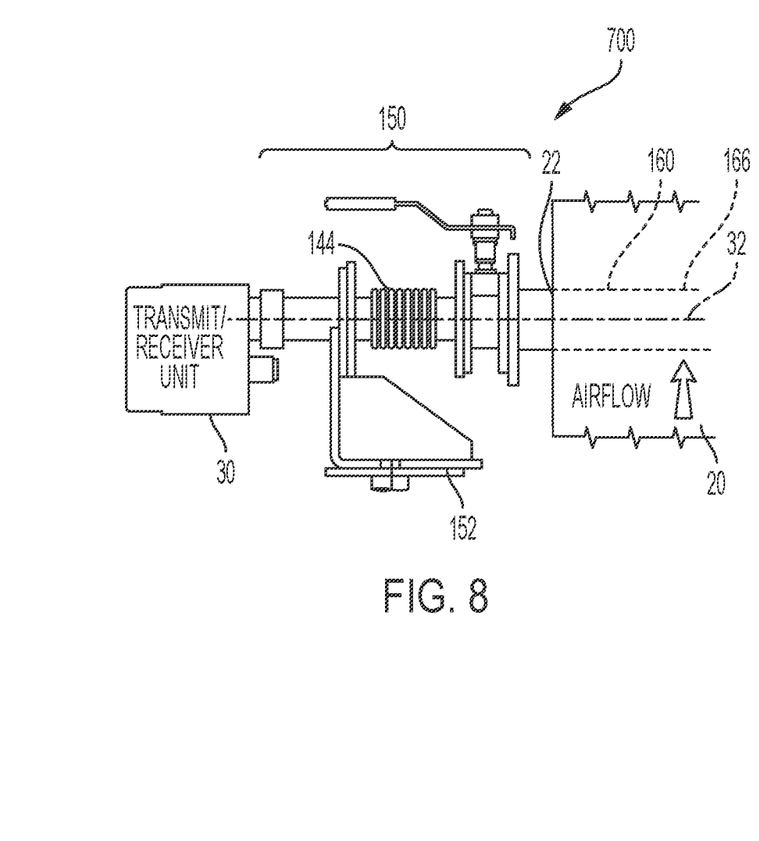
FIG. 8 is a schematic illustration of yet another embodiment of a mounting system for a laser detection sensor in a ductwork which includes an additional support bracket.

FIG. 8 is a schematic illustration of yet another embodiment of a mounting system 700 for a laser detection sensor in a ductwork 20 which includes an additional support bracket 152. In particular, as shown in FIG. 8, in one illustrative embodiment, the laser transmitter mount 150 includes a flexible joint 144 which is configured to isolate the laser transmitter 30 from movement of the ductwork 20. The support bracket 152 provides additional structure to secure the laser transmitter mount 150 to the surrounding environment, such as the building steel or foundation. It should be appreciated that in another embodiment, a similar support bracket may provide additional structure to secure the laser receiver 34 on the other side of the ductwork 20.

The size, shape and material of the ductwork 20 may vary as the disclosure is not limited in this respect. The cross-sectional shape of the ductwork 20 may vary and may for example be circular, rectangular, oval, and/or square shaped. In one embodiment, the ductwork 20 has a substantially constant cross-sectional dimension. In another embodiment the walls of the ductwork may vary, and may for example be diverging or converging. In one embodiment, the ductwork 20 is made of a stainless steel alloy or carbon steel alloy. In one embodiment, the thermal expansion coefficient of the ductwork 20 walls ranges from about $5.5 \times 10^{-6}$ inch/inch-F to about $9.6 \times 10^{-6}$ inch/inch-F. In one embodiment, the ductwork 20 is configured to receive gases, the gases having a temperature ranging from ambient temperatures to about 900° F.

Aspects of the present disclosure are directed to a mounting system for a laser detection sensor in the ductwork of an apparatus for drying, bonding and/or curing a web. One of ordinary skill in the art will appreciate that the apparatus may be configured to manufacture various products, such as paper/tissue/board and/or nonwoven webs. In one embodiment, the apparatus is a through-air apparatus. In another embodiment, other types of hot air dryers are also contemplated. The apparatus may be configured for drying, curing, or bonding, and one of ordinary skill in the art would recognize that the apparatus may be configured as a through-air dryer (TAD) and/or a through-air bonder (TAB), and/or a Yankee drying system, and/or floatation dryer, and/or impingement depending on the context in which the apparatus is used. One of ordinary skill in the art will also recognize any of these heated air systems may be used to make various web products that are rolled in their finished end product form. It should also be recognized that the product may not be rolled and/or may be cut into a finished end product. Furthermore, one of ordinary skill in the art will also recognize that the apparatus may be configured to make various products, including, but not limited to various films, fabric, or other web type material, and the apparatus may be used for various processes that may include mass transfer, heat transfer, material displacement, web handling, and quality monitoring, including, but not limited to drying, thermal bonding, sheet transfer, water extraction, web tensioning, and porosity measurement.

Aspects of the present disclosure are directed to system for detecting unburnt fuel in an apparatus for drying, bonding and/or curing a web that may be used in the above described processes. The system includes a ductwork 20, a laser detection sensor including a laser transmitter 30 and a laser receiver 34, the laser detection sensor configured to detect unburnt fuel inside of the ductwork 20. The system for mounting the laser detection sensor in the ductwork also includes laser transmitter mount 150 configured to support the laser transmitter 30 on a first side of the ductwork 20, a laser receiver mount 140 configured to support the laser receiver 34 on a second side of the ductwork 20.

It should be appreciated the size and shape of the ductwork 20 may vary but regardless of the specific shape of the ductwork, the laser transmitter mount 150 is positioned on one side of the ductwork, such that a laser path 32 extending between the laser transmitter 30 and the laser receiver 34 passes through the ductwork 20. As shown in FIGS. 2-7, the laser path 32 includes an entrance port 22 in the ductwork 20 and an exit port 24 in the ductwork. The system further includes a flexible joint 142, 144 in the mounting system, where the flexible joint 142, 144 is configured to isolate at least one of the laser transmitter 30 and the laser receiver 34 from movement of the ductwork 20.

Although several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto; the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated in their entirety herein by reference.

What is claimed is:

1. A mounting system for a laser detection sensor in a ductwork for the detection of unburnt fuel, the mounting system comprising:
   a laser transmitter mount configured to provide adjustment of a laser transmitter;

a laser receiver mount configured to provide adjustment of a laser receiver;
a laser path extending between the laser transmitter and the laser receiver, wherein the laser path includes an entrance port in the ductwork and an exit port in the ductwork; and
a flexible joint in the mounting system, wherein the flexible joint is configured to isolate at least one of the laser transmitter and the laser receiver from movement of the ductwork; and wherein the flexible joint is a bellows expansion joint positioned between the laser transmitter and the laser receiver.

2. The mounting system recited in claim 1, wherein the flexible joint is positioned adjacent the entrance port in the ductwork.

3. The mounting system recited in claim 1, wherein the flexible joint is positioned adjacent the exit port in the ductwork.

4. The mounting system recited in claim 1, wherein the flexible joint includes a first flexible joint positioned adjacent the entrance port in the ductwork, and a second flexible joint positioned adjacent the exit port in the ductwork.

5. The mounting system recited in claim 1, further comprising a pipe with one or more openings, the pipe extending through the ductwork from a first end extending outwardly from the entrance port in the ductwork to a second end extending outwardly from the exit port in the ductwork.

6. The mounting system recited in claim 5, wherein the flexible joint is positioned adjacent the first end of the pipe.

7. The mounting system recited in claim 5, wherein the flexible joint is positioned adjacent the second end of the pipe.

8. The mounting system recited in claim 5, wherein the flexible joint includes a first flexible joint positioned adjacent the entrance port in the ductwork, and a second flexible joint positioned adjacent the exit port in the ductwork.

9. The mounting system recited in claim 1, wherein the flexible joint is configured to isolate at least one of the laser transmitter and the laser receiver from thermal expansion of the ductwork.

10. The mounting system recited in claim 1, wherein the flexible joint is configured to isolate at least one of the laser transmitter and the laser receiver from movement, deflection, or distortion of the ductwork caused by vibration, fluid pressure, applied forces, or flow variations within the ductwork.

11. The mounting system of claim 1, in combination with a ductwork.

12. The mounting system of claim 1, in combination with a laser detection sensor which includes a laser transmitter and a laser receiver.

13. The mounting system recited in claim 1, wherein at least one of the laser transmitter mount and the laser receiver mount are configured to provide angular adjustment of the respective laser transmitter or laser receiver.

14. The mounting system recited in claim 1, wherein at least one of the laser transmitter mount and the laser receiver mount are configured to provide linear adjustment of the respective laser transmitter or laser receiver.

15. A mounting system in combination with a ductwork, wherein the mounting system is for a laser detection sensor in the ductwork for the detection of unburnt fuel, the mounting system comprising:
a laser transmitter mount configured to provide adjustment of a laser transmitter;
a laser receiver mount configured to provide adjustment of a laser receiver;
a laser path extending between the laser transmitter and the laser receiver, wherein the laser path includes an entrance port in the ductwork and an exit port in the ductwork; and
a flexible joint in the mounting system, wherein the flexible joint is configured to isolate at least one of the laser transmitter and the laser receiver from movement of the ductwork;
wherein the walls of the ductwork are made of a stainless steel alloy or carbon steel alloy, wherein a thermal expansion coefficient of the ductwork walls ranges from about $5.5 \times 10^{-6}$ inch/inch-F to about $9.6 \times 10^{-6}$ inch/inch-F.

16. A mounting system in combination with a ductwork, wherein the mounting system is for a laser detection sensor in the ductwork for the detection of unburnt fuel, the mounting system comprising:
a laser transmitter mount configured to provide adjustment of a laser transmitter;
a laser receiver mount configured to provide adjustment of a laser receiver;
a laser path extending between the laser transmitter and the laser receiver, wherein the laser path includes an entrance port in the ductwork and an exit port in the ductwork; and
a flexible joint in the mounting system, wherein the flexible joint is configured to isolate at least one of the laser transmitter and the laser receiver from movement of the ductwork;
wherein the ductwork is configured to receive gases flowing therethrough, the gases having a temperature ranging from ambient temperatures to about 900° F.

17. A system for detecting unburnt fuel in an apparatus for drying, bonding and/or curing a web, the system comprising:
a ductwork;
a laser detection sensor including a laser transmitter and a laser receiver, the laser detection sensor configured to detect unburnt fuel inside of the ductwork; and
a system for mounting the laser detection sensor in the ductwork, the mounting system further comprising:
a laser transmitter mount configured to support the laser transmitter on a first side of the ductwork;
a laser receiver mount configured to support the laser receiver on a second side of the ductwork;
a laser path extending between the laser transmitter and the laser receiver, wherein the laser path includes an entrance port in the ductwork and an exit port in the ductwork; and
a flexible joint in the mounting system, wherein the flexible joint is configured to isolate at least one of the laser transmitter and the laser receiver from movement of the ductwork; and wherein the flexible joint is a bellows expansion joint positioned between the laser transmitter and the laser receiver.

18. The mounting system recited in claim 17, wherein the flexible joint is positioned adjacent the entrance port in the ductwork.

19. The mounting system recited in claim 17, wherein the flexible joint is positioned adjacent the exit port in the ductwork.

20. The mounting system recited in claim 17, wherein the flexible joint includes a first flexible joint positioned adjacent the entrance port in the ductwork, and a second flexible joint positioned adjacent the exit port in the ductwork.

21. The mounting system recited in claim 17, further comprising a pipe with one or more openings, the pipe extending through the ductwork from a first end extending outwardly from the entrance port in the ductwork to a second end extending outwardly from the exit port in the ductwork.

22. The mounting system recited in claim 21, wherein the flexible joint is positioned adjacent the first end of the pipe.

23. The mounting system recited in claim 21, wherein the flexible joint is positioned adjacent the second end of the pipe.

24. The mounting system recited in claim 17, wherein the flexible joint is configured to isolate at least one of the laser transmitter and the laser receiver from thermal expansion of the ductwork.

25. The mounting system recited in claim 17, wherein the flexible joint is configured to isolate at least one of the laser transmitter and the laser receiver from movement, deflection, or distortion of the ductwork caused by vibration, fluid pressure, applied forces, or flow variations within the ductwork.

* * * * *